United States Patent [19]

Hackett

[11] Patent Number: 5,185,663
[45] Date of Patent: Feb. 9, 1993

[54] APPARATUS FOR PROCESSING PREDISTORTED FIRST VIDEO SIGNAL AND DATA REDUCED SECOND VIDEO SIGNAL

[75] Inventor: Andrew Hackett, Obernai, France

[73] Assignee: Deutsche Thomson-Brandt GmbH, Fed. Rep. of Germany

[21] Appl. No.: 688,485
[22] PCT Filed: Nov. 7, 1989
[86] PCT No.: PCT/EP89/01327
  § 371 Date: Jul. 1, 1991
  § 102(e) Date: Jul. 1, 1991
[87] PCT Pub. No.: WO90/06037
  PCT Pub. Date: May 31, 1990

[30] Foreign Application Priority Data
  Nov. 15, 1988 [DE] Fed. Rep. of Germany ....... 3838609

[51] Int. Cl.$^5$ ............ H04N 5/92; H04N 11/04
[52] U.S. Cl. .................. 358/140; 358/183; 358/11
[58] Field of Search ............ 358/140, 141, 11, 36, 358/37, 22, 166, 167, 138, 183, 142

[56] References Cited

U.S. PATENT DOCUMENTS

| | | | |
|---|---|---|---|
| 4,633,330 | 12/1986 | Yamamitsu | 358/310 |
| 4,652,909 | 3/1987 | Glenn | 358/41 |
| 5,010,392 | 4/1991 | Croll | 358/11 |
| 5,130,800 | 7/1992 | Johnson et al. | 358/22 |

FOREIGN PATENT DOCUMENTS 0114693  8/1984  European Pat. Off.
3435265  4/1986  Fed. Rep. of Germany

OTHER PUBLICATIONS

H. Sauerburger, "Breit-und schmalbandige kompatible einkanalige HDTV-Übertragung", vol. 41, No. ½, 1987.
V. G. Schamel, "Mehrdimensionale Vorfilterung, Reduktion der Abtastrate und Interpolation von HDTV-Signalen", vol. 42, No. 10, Oct. 1988.

*Primary Examiner*—Victor R. Kostak
*Assistant Examiner*—Glenton B. Burgess
*Attorney, Agent, or Firm*—Joseph S. Tripoli; Eric P. Herrmann; Ronald H. Kurdyla

[57] ABSTRACT

A system to facilitate mixing and recording video signals of different standards, e.g., in digital format via a digital video recorder, is disclosed. A first video signal in progressive scan format is converted to a standard format (e.g., line interlaced) prior to recording. A standard second video signal (e.g., line interlaced) is predistorted without format conversion prior to recording with the first signal to reduce artifacts associated with post-processing after recording. The predistortion involves vertically displacing selected picture elements. Before being displayed, a video output signal from the recorder is converted to the scan format of the first video signal.

11 Claims, 5 Drawing Sheets

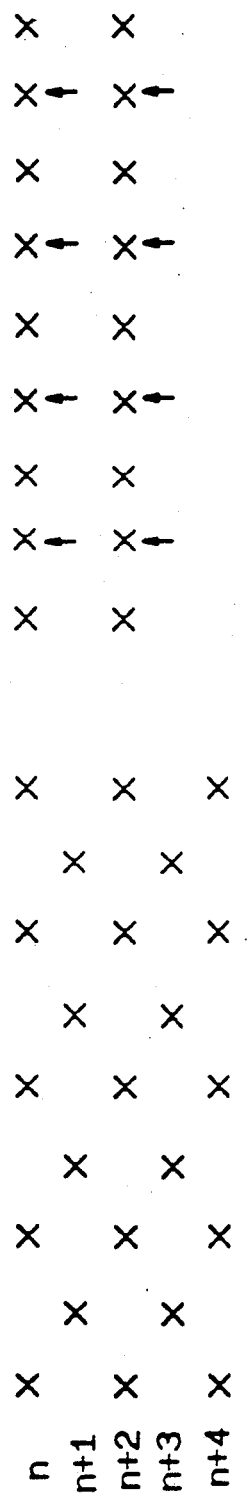

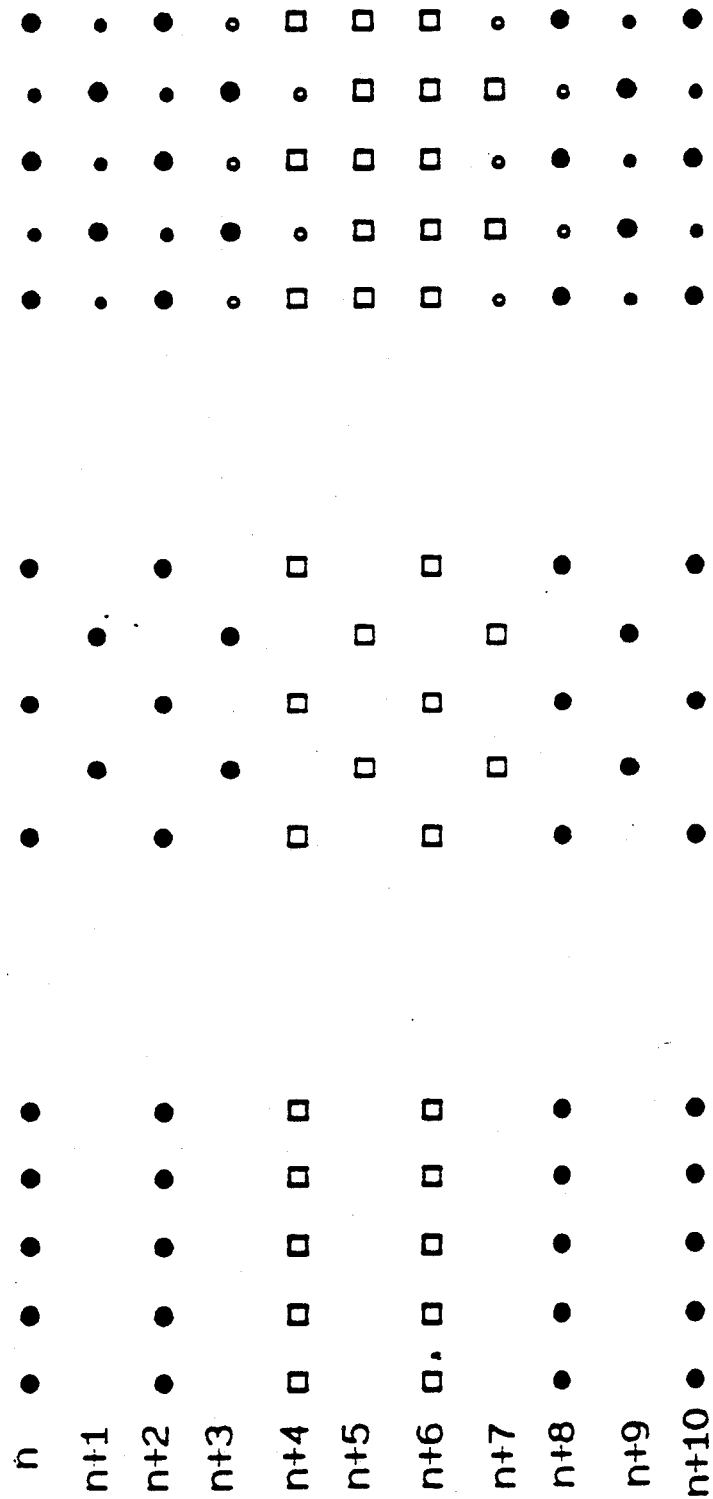

APPARATUS FOR PROCESSING PREDISTORTED FIRST VIDEO SIGNAL AND DATA REDUCED SECOND VIDEO SIGNAL

FIELD OF THE INVENTION

This invention concerns a system for the processing and reproduction of video signals.

BACKGROUND OF THE INVENTION

The introduction of digital video recorders makes it possible to record conventional video signals which, for example, meet the CCIR 601 standard in a digital format. It is thus possible to digitally record video signals and to reproduce them in the identical format.

By using a standardized video recording device it is thus possible to mix program material of different standards and to record it in one standard. For example, one video signal can be provided from a camera which supplies a progressively scanned video signal with 625 lines and a picture frequency of 50 Hz, and a second signal from another source can be a standard line interlaced video signal with 625 lines and a picture frequency of 50 Hz.

A recording device according to the CCIR 601 standard, for example, can record only line interlaced video signals and is characterized by a limited band width. Thus it is necessary to reduce the data rate of a progressively sampled video signal, and to convert the signal to a line interlaced video signal. Data reduction can be performed, for example, by filtering. The generation of a line interlaced video signal can, for example, be performed in connection with such filtering by means of a so-called line shuffling technique. A video signal so obtained constitutes a signal according to the CCIR 601 standard and therefore can be recorded. Post-processing by means of inverse line shuffling and inverse filtering can be employed to enhance the reproduction of the original progressive video signal image.

U.S. Pat. No. 4,652,909 and H. Sauerberger, "Breit und Schmalbandige Kompatible Einkanalige HDTV-Ubertragung (Compatible Single Channel HDTV Transmission with Wide and Narrow Bands)", Fernseh- und Kinotechnik No. ½ 1987, discuss how progressively scanned video signals are filtered, subsampled and provided with artificial line interlacing so that they can be transmitted via standard television channels. U.S. Pat. No. 4,652,909 also describes how such signals can be recorded or reproduced.

The original progressive video signals with artificial interlacing can also be mixed with standard video signals and recorded, for example, after such preprocessing. Combined signals so generated are also subjected to post-processing for reproduction enhancement. However, in doing this the recorded standard video signals are also post-processed upon playback, resulting in visible image distortion associated with these signals. U.S. Pat. No. 4,652,909 and the Sauerburger article do not address the problems resulting from such processing of video signals, and offer no solution for such problems.

It is an object of the invention to provide a picture processing system which is able to mix, record and reproduce television signals of different standards, and to avoid errors associated with post-processing.

SUMMARY OF THE INVENTION

In accordance with the principles of the present invention, a standard television video signal is subjected to a precorrection which reduces errors due to post-processing. In an illustrated preferred embodiment of the invention, a video signal is represented by picture elements arranged in the form of horizontal lines and vertical columns for a given field. For pre-correction, picture elements from every other (second) column of the input video signal are interpolated and shifted in the vertical direction, namely in the same direction as the picture elements of the progressively scanned video signals during the generation of a video signal with artificial interlacing. The amount of such vertical displacement of picture elements is one-half line.

In accordance with a feature of the invention, a line conversion can be performed in order to avoid errors associated with post-processing of the video signal. As a result, a picture is produced with a doubled number of lines and with the same format as the progressive source signal. Further processing such as filtering and line shuffling can thus be performed identically on both signals.

BRIEF DESCRIPTION OF THE DRAWINGS

FIGS. 1a and 1b depict several scanning lines of an image field after processing of a progressively scanned input signal.

FIGS. 2a and 2b depict several scanning lines of an image field for a progressively scanned video signal containing black and white information.

FIGS. 3a, 3b and 3c depict several scanning lines of an image field of a video signal without predistortion.

FIGS. 5-9 illustrate block diagrams of apparatus associated with the operation of a system according to the present invention.

DETAILED DESCRIPTION

FIG. 1a shows a video signal without line interlacing after having been subjected to data reduction via a data reduction stage. The picture elements of lines n, n+1, etc., exhibit a quincunx structure as illustrated, after diagonal filtering. FIG. 1b shows an arrangement of the picture elements of FIG. 1a after line shuffling. In FIG. 1b the picture elements of each 2n+1th line of the progressive input video signal are shifted to the 2nth line, creating a video field with half the number of lines of the input video signal.

FIG. 2a depicts an input video signal having black-and-white transitions from line to line. A line shuffling process performed as mentioned with regard to FIG. 1b develops a video signal with horizontal black-and-white transistions as shown in FIG. 2b.

FIGS. 3a–3b show the effect of post-processing on a standard TV (television) signal with line interlacing (FIG. 3a). Large dark circles represent black picture elements of the original image, and large light rectangles represent white picture elements of the original image. Small light and dark circles represent picture elements produced by a post-correction process as will be discussed.

As seen from FIG. 3b, picture elements of original lines are vertically shifted to in-between line positions 2n+1 by means of inverse line shuffling. Subsequent selective post-filtering for developing a progressive video signal to be reproduced, FIG. 3c, consequently exhibits a saw-tooth structure determined by the black-and-white content of lines n+3, n+8. In order to avoid this saw-tooth structure which was not present in the original picture, the interlaced video signal is predistorted prior to processing in the studio, as illustrated by FIGS. 4a-4d.

Figures 4A, 4B, 4C, 4D:
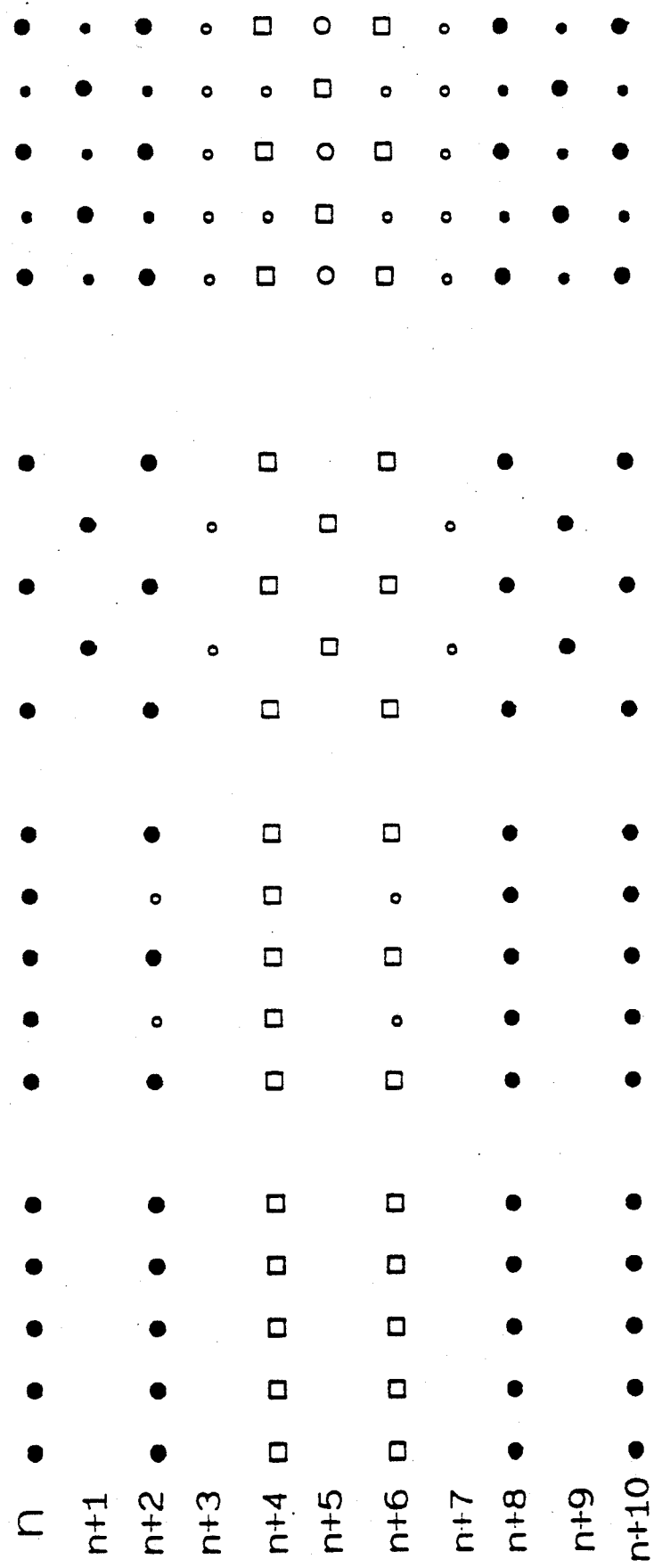
FIGS. 4a, 4b and 4c depict several scanning lines of an image field of a video signal with predistortion.

FIG. 4a also shows picture elements of one field of a standard TV signal with black-and-white transitions, similar to FIG. 3a. As shown in FIG. 4b, by means of a halfline-wise vertical shifting of picture elements (with respect to the lines of the field), i.e., by interpolating picture elements positioned vertically above each other, interpolated pixel values are provided in every other pixel gap. In FIG. 4b the interpolated pixel values are depicted as small light circles which are created in lines n+2, n+6 and which replace the original picture elements.

FIG. 4c shows the result of the processing stage after inverse line shuffling is performed for this field. A corresponding result applies to the second field. FIG. 4d represents the result appearing at the output of the video processing system. As can be seen from lines n+3, n+7, the saw-tooth structure in line transitions with high frequency vertical structure is largely avoided by predistorting the signal.

In the video processing system of FIG. 5, a video camera 1 provides a progressive video signal with 625 lines and a picture scanning frequency of 50 Hz. This signal is applied to a diagonal filter 2 and a line shuffling circuit 3. An output signal from circuit 3 is recorded by a standardized video recording device 4 which may also, for example, contain a mixer for different types of video input signals. For enhancing a reproduced image the video signal is fed to an inverse line shuffling circuit 5 and a slective post-filter 6, the output signal of which can be reproduced by a monitor 7.

An interlaced video signal from a standard video camera 9 is predistorted by means of a predistortion circuit 8 and applied to video recoding device 4. The predistortion provided by circuit 8 largely avoids the disadvantages described in connection with FIG. 3.

In accordance with a further feature of the invention, the signal from standard camera 9 can, alternatively, be applied to a line converter 10. By means of line converter 10 the video signal from standard camera 9 is converted into a format identical to the progressive scan format of the video signal from camera source 1 prior to filtering by filter 2. The video signal so generated runs in parallel through circuit 3 when it is subjected to line shuffling and, as a cumulative (sum) signal after recording by unit 4, through the same processing stages as the progressive video signal.

Figure 6:
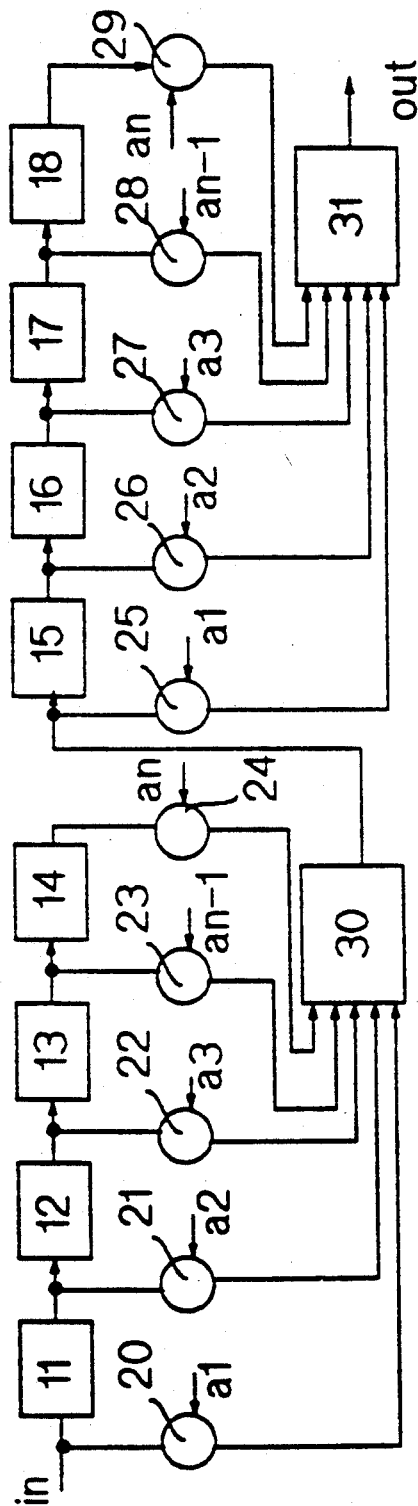

FIG. 6 shows details of diagonal filter 2 (FIG. 5). An input signal is applied to cascaded delay elements 11 through 14 arranged as shown. The undelayed input signal and the outputs of delay elements 11-14 are coupled to inputs of signal weighting networks 20-24, respectively, which also respond to filter weighting coefficients a1, a2 ..., an−1, an. Weighted output signals from weighting circuits 20-24 are applied to inputs of a summation circuit 30, the output signal of which is applied to a second delay network including cascaded delay elements 15 through 18. The output signal of circuit 30 and the output signals from delay elements 15-18 are also applied to weighting circuits 25-29 which also respond to weighting factors a1, a2, ..., an−1, an. Output signals from weighting circuits 25-29 are applied to a summing circuit 31, the output signal of which is applied to line shuffling circuit 3.

Figure 7:
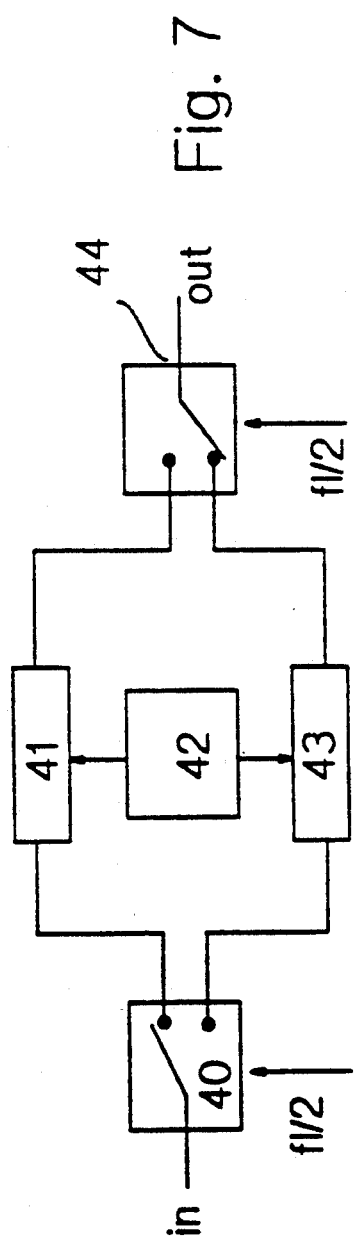

FIG. 7 shows details of line shuffling circuit 2 (FIG. 5). The output signal from summing circuit 31 is applied to an input of a controllable switch 40. The operation of switch 40 is controlled by a signal C1 at one half of the line frequency, $f_{\frac{1}{2}}$. Data from outputs of switch 40 are written into a line memory 41 or a line memory 43, respectively, depending upon the position of switch 40. Addressing of line memories 41, 43 is accomplished by means of an address generator 42. The outputs of line memories 41, 43 are connected to a controllable switch 44, the operation of which is controlled by a signal C2 at half the line frequency $f_{\frac{1}{2}}$. The input lines are written into a line memory so that even sample values of the first line are written into the memory with even addresses, and odd sample values of the second line are written into odd addresses of the same memory.

Figure 8:
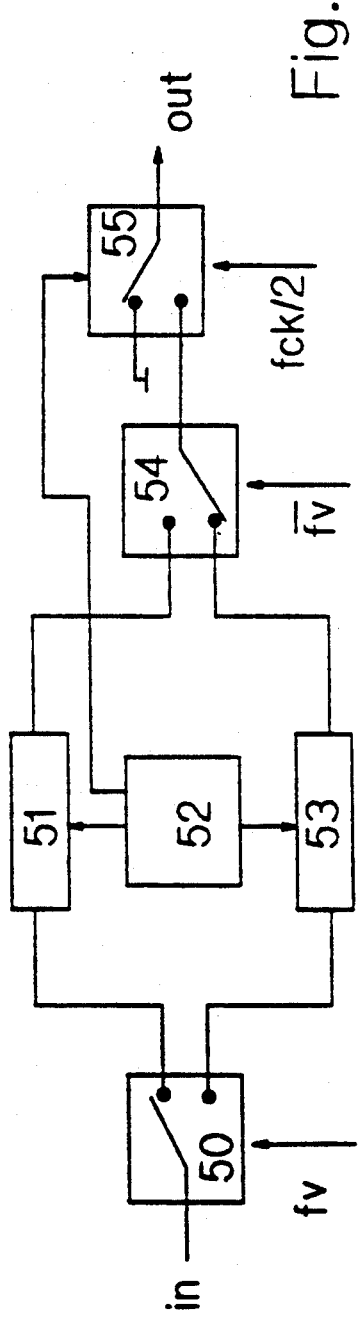

FIG. 8 shows details of an inverse line shuffling circuit 5 (FIG. 5), which operates in a way complementary to that of the line shuffling circuit shown in FIG. 7. The input data is applied to a controlled switch 50 which changes position at a frequency fv in response to a signal C3. Outputs of switch 50 are respectively connected to line memories 51 and 53, the addresses of which are selected by means of an address generator 52. The outputs of line memories 51, 53 are connected to respective inputs of a controlled switch 54 which changes position in response to an inverse control signal C3 of frequency fv. The output of switch 54 is connected to one input of controlled switch 55. A second input of switch 55 is connected to reference potential, e.g., ground reference potential. Switch 55 changes position in response to a control signal C4.

The inverse line shuffling circuit operates as follows. The input lines are read into memory 51 or memory 53 sequentially. During this period data of the lines written into the other memory are read out from there. The clock pulse frequency of the output line is twice as high as the clock frequency of the input line. During the reading process the even sample values are read for the duration of an output line, whereas odd sample values are read for the duration of a second line. In order to attain a so-called "ping-pong" structure for interpolation filter 6 (FIG. 5) certain sample values are set to zero by means of a control line of address generator 52. The sample values of the first line read out, which are set to zero, are the even sample values and, in the case of the second line read out, are the odd sample values.

Figure 9:
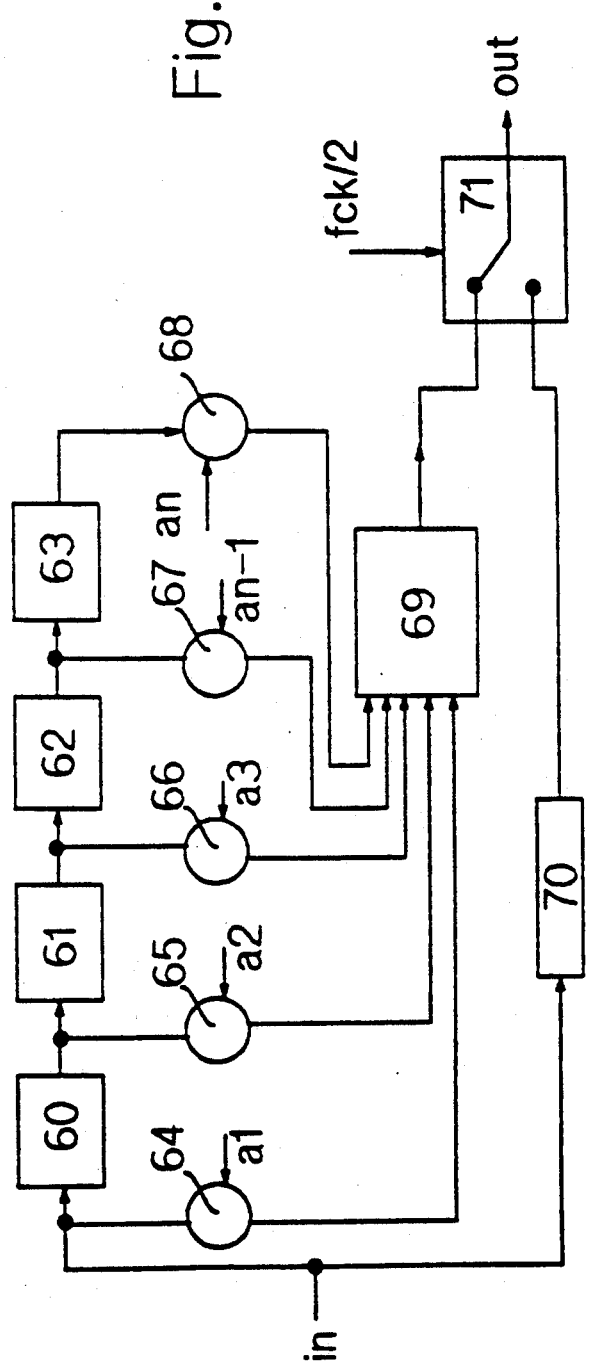

FIG. 9 shows details of predistortion circuit 8 (FIG. 5). This circuit basically is an all-pass vertical digital filter exhibiting a delay of one half line. The input signal is fed to line memories 60, 61, 62, 63 as shown. The input signal and output signals from memories 60-63 are applied to signal weighting circuits 64 through 68. The signal data input to units 64-68 is weighted by weighting factors a1 through an. Output signals from weighting circuits 64 through 68 are coupled to a summation circuit 69. The input signal is also applied to a line delay circuit 70. The output signal from line delay 70 is applied to an input of a controlled switch 71. The position of switch 71 changes at the clock frequency fck/2 of half the pixel frequency in response to a control signal C5. The filter of FIG. 9 exhibits a delay of one half line.

The arrangements shown in FIG. 6 through FIG. 9 are illustrative embodiments of certain functional blocks shown in FIG. 5. Other embodiments of the functional blocks are possible.

I claim:

1. Apparatus for processing video signals, comprising:
    means for providing a first video signal;
    means for providing a second video signal with resolution greater than that of said first video signal;
    data reduction means responsive to said second video signal for providing a data reduced second video signal;
    video signal formatting means responsive to said data reduced second video signal for producing a line interlaced data reduced second video signal;
    studio signal processing means responsive to said data reduced interlaced second video signal and to said first video signal;
    means for predistorting said first video signal by vertically displacing selected picture elements of said first video signal, prior to processing by said studio signal processing means; and
    video signal image enhancement means disposed after said studio signal processing means for processing both said predistorted first video signal and said data reduced interlaced second video signal.

2. Apparatus according to claim 1 wherein
    said enhancement means develops an output progressive scan video signal.

3. Apparatus according to claim 2 wherein
    said enhancement means includes filter means and line translating means.

4. Apparatus according to claim 1, wherein
    said studio signal processing means includes means for combining said predistorted first video signal and said data reduced interlaced second video signal.

5. Apparatus according to claim 4, wherein
    said first signal is a standard video signal; and
    said studio signal processing means includes a digital video recorder responsive to said predistorted first video signal and to said data reduced interlaced second video signal.

6. Apparatus according to claim 1, wherein
    said predistoring means includes video signal interpolation means.

7. Apparatus according to claim 1, wherein
    said predistorting means includes interpolation means for displacing picture elements by a half line in a vertical direction.

8. Apparatus according to claim 1, wherein
    said predistoring means predistorts every other picture element within a given image line.

9. Apparatus according to claim 1, wherein
    said data reduction means displaces picture elements in a vertical direction.

10. Apparatus for processing video signals, comprising:
    means for providing a first video signal;
    means for providing a second video signal with higher resolution than said first video signal;
    data reduction means responsive to said second video signal for displacing picture elements in a vertical direction to produce a data reduced second video signal;
    formatting means responsive to said data reduced second video signal for producing a line interlaced data reduced second video signal;
    studio signal processing means responsive to said data reduced interlaced second video signal and to said first video signal;
    means for transcoding said first video signal to a scanning format similar to that of said second video signal;
    video signal enhancement means for processing said data reduced second signal and said transcoded first video signal; and
    means for coupling said transcoded first video signal to said data reduction means and said formatting means for processing thereby, prior to processing by said studio processing means; wherein
    both said transcoded first video signal and said higher resolution second video signal are processed by said data reduction means, said formatting means, said studio processing means and said enhancement means.

11. Apparatus according to claim 10, wherein
    said studio signal processing means comprises digital video signal recorder means.

* * * * *